3,274,175
PENICILLIN DERIVATIVES
Hugh Colin Richards, David Frank Spooner, and John Rosindale Housley, Nottingham, England, assignors to Boots Pure Drug Company Limited, Nottingham, England, a British company
No Drawing. Filed Nov. 26, 1962, Ser. No. 240,149
Claims priority, application Great Britain, Dec. 7, 1961, 43,865/61; Mar. 7, 1962, 8,805/62
5 Claims. (Cl. 260—239.1)

This invention relates to improvements in or relating to antibiotics. More particularly it relates to novel penicillins that are highly active against certain bacteria. It also relates to processes for preparing the new penicillins and to therapeutic compositions thereof.

It is an object of the present invention to provide new penicillins that are highly active against bacteria. It is another object of the invention to provide pencillins with a high level of activity against bacteria that are resistant to known penicillins such as benzylpenicillin. A further object of the invention is to provide penicillins adapted for oral administration which are stable in the presence of acid.

According to the present invention there are provided novel pencillins of the general formula:

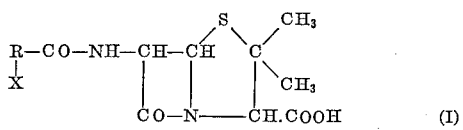

and non-toxic amides and salts thereof, in which X represents a carboxyl group or a non-toxic ester or amide thereof, and R represents the residue of a heterocyclic o-dicarboxylic acid of the general formula:

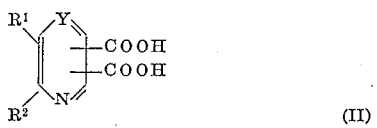

in which Y represents a nitrogen atom or the group =CH—, and $R^1$ and $R^2$, which may be the same or different, represent hydrogen atoms or lower alkyl radicals, or $R^1$ and $R^2$ together represent a fused benzene ring, which may carry substituents. For example the benzene ring may carry one or more lower alkyl radicals or chlorine atoms.

The non-toxic salts may be either inorganic salts such as the ammonium salt or salts of such non-toxic amines as dibenzylamine, N,N¹-dibenzylethylenediamine, triethylamine, N-benzyl-β-phenethylamine and other amines which have been used to form salts with benzylpenicillin.

There is also provided a process for preparing the penicillins of the above general formula by reacting 6-aminopencillanic acid with an acid chloride of the general formula:

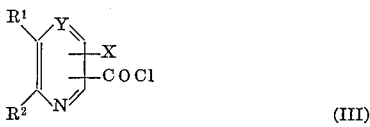

in which $R^1$, $R^2$, Y and X are as hereinbefore defined and the X and COCl groups occupy adjacent positions on the heterocyclic ring, or its functional equivalent as an acylating agent for a primary amino group.

Functional equivalents of the acid chloride of general Formula III above include the corresponding acid bromide, acid anhydride, cyclic acid anhydride, mixed anhydrides with other acids such as ethoxyformic acid and a mixture of the corresponding carboxylic acid with a carbodiimide such as 1,3-dicyclohexylcarbodiimide.

The process does not however include the reaction of 6-aminopenicillanic acid with an acid chloride of general Formula III above in which X is a carboxyl group, or the corresponding acid bromide or acid anhydride, as such acid halides and acid anhydrides having a free o-carboxyl group are not acessible.

The acylating agent used for the preparation of the penicillins of general Formula I above depends to some extent on the nature of the group X. Penicillins in which X is a carboxyl group may be prepared by acylating 6-aminopenicillanic acid with the appropriate cyclic anhydride. The reaction may be carried out in an inert organic solvent such as dimethylformamide and preferably also in the presence of an excess of a tertiary amine such as triethylamine. A convenient procedure is to add the cyclic anhydride to a chilled, stirred solution or suspension of 6-aminopenicillanic acid in dimethylformamide anl triethylamine. This procedure may be carried out under anhydrous conditions or in the presence of a small amount of water. Thus it is convenient to use the aqueous azeotrope of triethylamine (90 w./w. base) which is commercially available. Penicillins of the general Formula I above in which X is a carboxyl group are preferably prepared by the cyclic anhydride method when solid 6-aminopencillanic acid, as opposed to an aqueous solution thereof, is available.

A further way of utilising the process of the present invention to prepare penicillins of the general Formula I above in which X represents a carboxyl group is to treat a mono- or di-salt of the appropriate heterocyclic o-dicarboxylic acid, e.g. the sodium, potassium or triethylamine salt with an alkyl chloroformate such as ethyl chloroformate and then to react the product with 6-aminopenicillanic acid, preferably in the form of a neutral salt such as the sodium, potassium and triethylamine salt. A suitable procedure is to treat a solution of the salt of the heterocyclic o-dicarboxylic acid in a water-miscible solvent such as tetrahydrofuran, acetone, or dioxan with ethyl chloroformate. After stirring for a period of about one hour, the solution is poured with stirring into an aqueous solution of the 6-aminopenicillanic acid salt. Preferably a mono-salt of the heterocyclic o-dicarboxylic acid is reacted with one molecular proportion of ethyl chloroformate and then with one molecular proportion of the 6-aminopenicillanic acid salt. Pencillins of the present invention are formed when a di-salt of the appropriate heterocyclic o-dicarboxylic acid is reacted with 2 molecular proportions of, for example, ethyl chloroformate and then with 2 molecular proportions of the 6-aminopenicillanic acid salt but the products are less pure than those prepared by the preferred procedure. Paper chromatography indicates the presence of ethoxypenicillin as an impurity, which is not present in the products prepared by the preferred procedure. The reaction of the heterocyclic o-dicarboxylic acid mono-salt with 1 molecular proportion each of ethyl chloroformate and 6-aminopenicillanic salt may proceed via the mixed anhydride of the heterocyclic acid with ethoxyformic acid or the cyclic anhydride of the heterocyclic acid may participate in the reaction.

Penicillins of the present invention which have a non-toxic amide or ester residue linked to the heterocyclic ring may be prepared by reacting 6-aminopenicillanic acid with a mixed anhydride of a hemi-amide or hemi-ester of the appropriate heterocyclic o-dicarboxylic acid. Suitable mixed anhydrides are those of alkoxyformic acids, which may be prepared by reacting the hemi-ester or hemi-amide with an alkyl chloroformate such as ethyl chloroformate. This reactant may be used in a similar way to that described above for the preparation of the o-carboxypenicillins of the present invention. Thus a convenient procedure is to treat a solution of the triethylamine salt of the hemi-ester or hemi-amide in a water-miscible solvent such as tetrahydrofuran, acetone or dioxan with ethyl chloroformate to form the mixed anhydride of the hemi-derivative and ethoxyformic acid. The solution of the mixed anhydride is then added to a stirred aqueous solution of 6-aminopenicillanic acid, preferably in the form of a neutral salt such as the sodium, potassium or triethylamine salt. It is very convenient to use the triethylamine salt of the hemi-ester or hemi-amide, but other salts, e.g. the sodium and potassium salts are suitable.

Similar acylation procedures may be employed when hemi-ester or hemi-amide acid chlorides are used in the process of the present invention in place of the above-mentioned hemi-ester or hemi-amide mixed anhydrides. Thus a suitable procedure is to add a solution of the hemi-derivative acid chloride in a water-miscible solvent to an aqueous solution of a salt of 6-aminopenicillanic acid. Reaction temperatures of about 0°–10° C. have been found to be suitable for all the acylation procedures described above.

The new penicillins may be isolated by techniques well known in the art, purification stages being incorporated where necessary. The penicillins may be isolated as such or may be converted to desired salts by known methods. It may be convenient to prepare the new penicillins from a fermentation liquor or concentrate thereof containing a suitable concentration of 6-aminopenicillanic acid.

Non-toxic amides of the penicillins of the general Formula I above are within the scope of the present invention. They may be prepared by reacting a mixed anhydride of the "penicillin nucleus" carboxyl group of the compounds of general Formula I with the appropriate amine. Functional equivalents of the mixed anhydride, e.g. the acid chloride, may of course be used.

A wide range of hemi-derivatives of quinoxaline 2,3-dicarboxylic acid has been converted to new penicillins by the acylation procedures for hemi-derivatives described above. The procedures are of course equally suitable for converting other hemi-derivatives to penicillins of the present invention. For example 3-ethoxycarbonylpyrazin-2-ylpenicillin, 3 - benzyloxycarbonylpyrazin-2-ylpenicillin, 3-carbamoylpyrazin-2-ylpenicillin, 3-piperidinocarbonylpyrazin-2-ylpenicillin and the corresponding penicillins prepared from the hemi-derivatives of pyridine-2,3-dicarboxylic acid and quinoline-2,3-dicarboxylic acid may be prepared in this way.

Penicillins of the above general Formula I in which Y is a =CH— group are produced as a mixture of two isomers in which the positions of the group X and the adjacent 6-carbamoylpenicillanic acid group are reversed. Both isomers have antibacterial activity and the mixture may be used therapeutically.

The penicillins of the above general Formula I are highly active against bacteria. They may be used in the combatting of disease in man and animals, especially in those diseases caused by Gram-positive bacteria. Many of the penicillins of the present invention are stable in the presence of acids and may be administered by mouth. Many are resistant to the action of penicillinase produced by bacteria such as benzylpenicillin-resistant strains of *Staphylococcus aureus*. The preferred compounds are resistant to attack by both acids and penicillinase and provide valuable compounds for the combatting of bacteria, in particular staphylococci, that are resistant to known penicillins such as benzylpenicillin. 3-carboxyquinoxalin-2-ylpenicillin is a preferred compound of the invention and a preferred salt of this penicillin is the disodium salt.

The in vitro activity of the new penicillins against twenty strains of *Staphylococcus aureus* with a wide range of sensitivity to benzylpenicillin was assessed as follows. Approximate minimum inhibitory concentrations were determined using a 3-fold dilution series in nutrient agar, sodium benzylpenicillinate being used as a control in each experiment. The results for three of the strains: A, B, and C (phage type 80/81) which are respectively sensitive, moderately resistant, and highly resistant to benzylpenicillin are given in Table I.

The in vivo activity in mice of some of the penicillins against the highly resistant strain C was determined. The compound under test was administered, either orally or sub-cutaneously, to groups of from five to ten animals that had been infected by the intraperitoneal injection of strain C. Approximate median effective doses ($ED_{50}$) were determined for the new compounds and for benzylpenicillin under the same conditions, and are included in the Table I.

It can be seen that the new penicillins have a much greater activity than benzylpenicillin against the highly resistant strains and possess useful activity against the sensitive strains. The results show that the in vivo activity of the o-carboxy penicillins of the present invention is not destroyed by converting the o-carboxyl group to an ester or amide thereof.

As a measure of the stability to acids, the "acid half lives" of some of the new penicillins in aqueous ethanol at pH 1.2 and temperature 37° C. were determined. The results are included in the Table I, from which it can be seen that the acid stabilities of the new penicillins tested compare favourably with that of phenoxymethylpenicillin (160 mins.) and greatly exceed that of benzylpenicillin (3½ miss.).

TABLE 1

| Penicillins | In vitro minimum inhibitory concentration (μg./ml.) | | | Acid half life (mins.) | $ED_{50}$ (mg./kg.) oral (O) or subcutaneous (S.C.) Strain C |
| --- | --- | --- | --- | --- | --- |
| | Strain A | Strain B | Strain C | | |
| Benzyl (Sodium Salt) | 0.01 | 33 | >500 | 3.5 | >100 (O). >100 (S.C.). |
| 3-carboxyquinoxalin-2-yl (disodium salt) | 0.4 | 0.4 | 0.4 | 267 | 35 (O). 2.0 (S.C.). |
| 3-carboxyquinol-2-yl+2,3-isomer (dibenzylamine salt) | 0.4 | 0.4 | 0.4 | 180 | 25 (O). <8 (S.C.). |
| 3-carboxypyrid-2-yl+2,3-isomer (potassium salt) | 1.2 | 3.7 | 11.1 | 100 | |
| 3-carboxypyrazin-2-yl (potassium salt) | 1.2 | 11.1 | 33.3 | >240 | |
| 3-carboxy-5,6-dimethylpyrazin-2-yl (potassium salt) | 3.7 | 11.1 | 33.3 | | |
| 3-carboxypyrid-4-yl +4,3-isomer (potassium salt) | 1.2 | 11.1 | 33.3 | | |
| 3-carboxy-6,7-dimethylquinoxalin-2-yl (bistriethylamine salt) | 3.7 | 3.7 | 11.1 | | |
| 3-benzyloxycarbonyl-quinoxalin 2-yl (potassium salt) | 0.4 | 0.4 | 1.2 | | 2.0 (S.C.). |

TABLE 1—Continued

| Penicillins | In vitro minimum inhibitory concentration (μg./ml.) | | | Acid half life (mins.) | ED$_{50}$ (mg./kg.) oral (O) or subcutaneous (S.C.) Strain C |
|---|---|---|---|---|---|
| | Strain A | Strain B | Strain C | | |
| 3-methoxycarbonylquinoxalin-2-yl (potassium salt) | 0.12 | 0.4 | 1.2 | 540 | 2.5 (S.C.). |
| 3-ethoxycarbonylquinoxalin-2-yl (potassium salt) | 0.4 | 0.4 | 1.2 | 315 | 3.0 (S.C.). |
| 3-n-propoxycarbonylquinoxalin-2-yl (potassium salt) | 0.12 | 0.4 | 1.2 | 455 | 6.0 (S.C.). |
| 3-isopropoxycarbonylquinoxalin-2-yl (potassium salt) | 1.2 | 1.2 | 11.1 | 810 | 6.0 (S.C.). |
| 3-butoxycarbonylquinoxalin-2-yl (potassium salt | 0.4 | 0.4 | 3.7 | | |
| 3-n-decycloxycarbonylquinoxalin-2-yl (potassium salt) | 11.1 | 33.3 | 100 | | |
| 3-diethylaminoethoxycarbonylquinoxalin-2-yl (potassium salt) | 0.4 | 1.2 | 3.7 | | |
| 3-cyclohexyloxycarbonylquinoxalin-2-yl (potassium salt) | 3.7 | 3.7 | 100 | 168 | 16.0 (S.C.). |
| 3-phenoxycarbonylquinoxalin-2-yl (potassium salt) | 0.4 | 0.4 | 1.2 | 255 | S3.0 (S.C.). |
| 3-carbamoylquinoxalin-2-yl (potassium salt) | 0.4 | 3.7 | 100 | | 33 (O). 2.0 (S.C.). |
| 3-diethylcarbamoylquinoxalin-2-yl (potassium salt) | 1.2 | 3.7 | 100 | | 5.0 (S.C.). |
| 3-n-propylcarbamoylquinoxalin-2-yl (potassium salt) | 0.4 | 1.2 | >100 | | 10.0 (S.C.). |
| 3-piperidinocarbonylquinoxalin-2-yl (potassium salt) | 0.4 | 1.2 | 33 | | 10.0 (S.C.). |
| 3-anilinocarbonylquinoxalin-2-yl (potassium salt) | 1.2 | 3.7 | >100 | | 10.0 (S.C.). |
| 3-(N-methylanilino)-carbonylquinoxalin-2-yl (potassium salt) | 0.4 | 1.2 | 11.1 | | 6.0 (S.C.). |
| 3-benzyloxycarbonylquinoxalin-2-yl-pencillinamide | 3.7 | 11.1 | 11.1 | | |

The resistance of pure samples of two of the new penicillins and benzylpenicillin to hydrolysis by cell-bound staphylococcalpenicillinase at 37° C. and pH 7.0 was determined manometrically by a slight modification of the method of Pollock [British Journal of Experimental Pathology 33, 587, (1955)]. The following results were obtained:

TABLE 2

| Penicillin | Hydrolysis expressed as a percentage of that of benzylpenicillin |
|---|---|
| 3-carboxyquinoxalin-2-yl | <0.5 |
| 3-carboxyquinol-2-yl (mixed with 2-carboxyquinol-3-yl isomer) | <0.5 |

Although many of the penicillins of the present invention are absorbed from the intestinal tract of animals such as dogs and some species of rodents, the rate of absorption from the human intestinal tract of some of the compounds, e.g. 3-carboxyquinoxalin-2-ylpenicillin, is very slow. Such compounds are therefore valuable for the treatment of human intestinal infections such as staphylococcal enterocolitis. For systemic treatment of other infections, such penicillins may of course be administered, parenterally, e.g. by subcutaneous or intramuscular injection.

3-carboxyquinoxalin-2-ylpenicillin has been found to be particularly suitable for treating bovine mastitis, for which purpose it is preferably administered in the form of an intramammary injection. Preferred formulations provide a rapid release of active material in the diseased udder, giving high initial penicillin levels with subsequent quick elimination of the antibiotic. Dispersibility of the active material is particularly important in the treatment of chronic or sub-clinical mastitis where it is likely that mechanical factors, e.g. fibrosis, will reduce the accessibility of the causal organisms. These requirements may conveniently be met by formulating the new penicillins in an anhydrous oleaginous base in conjunction with a suitable surface active agent. Known penicillins e.g. benzylpenicillin, may be included in these compositions.

The novel compositions provided by the present invention comprise a penicillin of general Formula I above in admixture with a pharmaceutically acceptable carrier. The new penicillins may be present in the form of salts with inorganic or organic bases that are non-toxic and that are well-known in the art for preparing salts of acidic antibiotics. Other antibiotics e.g. benzylpenicillin may be included in the compositions of the persent invention. The compositions may take any of the well-known medicinal dosage forms, e.g. tablets, lozenges, solutions or suspensions.

The following non-limitative examples illustrate the invention.

*Example 1*

Quinoxaline-2,3-dicarboxylic acid anhydride (0.83 g., 0.00416 mole) was added during 2 minutes to a suspension of 6-aminopenicillanic acid (0.896 g., 0.00416 mole) in dimethylformamide (2.5 ml.) and triethylamine (1.75 ml.) which had been stirred for 2 hours at 0° C. Stirring at 0° C. was continued for 35 minutes, the semi-solid mass was filtered, and the residue washed with dry acetone and dry ether. There was thus obtained the monohydrated bis-triethylamine salt of 3-carboxyquinoxalin-2-ylpenicillin, M.P. 135–137° C. (dec.) $[\alpha]_D^{20}$ in water +142° C. (c., 0.376). (Found: C, 56.3; H, 7.4; S, 5.1; N, 13.4; $H_2O$, 3.3; $C_{30}H_{48}N_6O_7S$ requires C, 56.6; H, 7.55; S, 5.03; N, 13.2; $H_2O$, 2.8%.)

In a similar way, 6,7-dimethylquinoxaline-2,3-dicarboxylic acid anhydride was converted to the bis-triethylamine salt of 3-carboxy-6,7-dimethylquinoxalin-2-ylpenicillin, M.P. 178° C. (dec). Colorimetric assay with hydroxylamine against a benzylpenicillin standard indicated a purity of ca. 94%.

*Example 2*

Quinoline-2,3-dicarboxylic acid anhydride (1.99 g., 0.01 mole) and 6-aminopenicillanic acid (2.16 g., 0.01 mole)

were reacted together in dimethylformamide (15 ml.) and triethylamine (4.2 ml.) in the manner described in Example 1. The addition of dry ether (50 ml.) precipitated an oil which was separated and dissolved in water (10 ml.). This aqueous solution was washed with ether (20 ml.), chilled, and acidified to pH 2 with shaking in the presence of a further portion of ether (30 ml.). The ethereal extract was washed with water (2 x 30 ml.), dried (magnesium sulphate), and then treated with benzylamine to pH 8.0. The light yellow precipitate was filtered, washed with dry ether (20 ml.) and dried in vacuo over phosphorus pentoxide.

There was thus obtained an isomeric mixture of the dibenzylamine salts of 3-carboxyquinol-2-ylpenicillin and 2-carboxyquinol-3-ylpenicillin, M.P. 154–157° C. (dec.), $[\alpha]_D^{20}$ in water +141° C. (c., 0.5). (Found: C, 63.6; H, 5.6; N, 10.8; $C_{33}H_{35}N_5O_6S$ requires C, 63.0; H, 5.55; N, 11.1.)

*Example 3*

Dimethylformamide (440 ml.) and re-distilled aqueous azeotrope of triethylamine (B.P. 76° C., 90% w./w. base, 96 ml.) were stirred in a 2-litre flask and cooled to 0–3° C. 6-aminopenicillanic acid (43.2 g., 0.2 mole) was added and the mixture stirred for 15 minutes. Quinoxaline-2,3-dicarboxylic acid anhydride (40 g., 0.2 mole) was added portionwise during 2 hours. Stirring at 0–3° C. was continued for a further 2 hours, during which time the product started to precipitate. Acetone (1320 ml.) was added with stirring and the mixture kept overnight at 0–3° C. The product was filtered, washed with acetone and dried under vacuum at 35° C. There was thus obtained the mono-hydrated bis-triethylamine salt of 3 - carboxyquinoxalin - 2 - ylpenicillin, M.P. 135–137° C. (dec.), $[\alpha]_D^{20}$ +138° C. (in water). Colorimetric assay with hydroxylamine against a benzylpenicillin standard corresponded to a purity of 110%.

The disodium salt of this penicillin was obtained as follows: a portion of the bis-triethylamine salt (67 g.) was dissolved in distilled water (200 ml.) and the resulting solution was treated with charcoal and filtered. Saturated sodium acetate solution (270 ml.) was added with stirring, causing precipitation of the disodium salt. After stirring for about 30 minutes the product was filtered, drained as dry as possible and then washed with absolute alcohol. The solid was then thoroughly slurried with absolute alcohol, filtered, slurried again with dry acetone, filtered and finally washed with dry acetone. The product was dried under vacuum at 35° C. There was thus obtained 3-carboxyquinoxalin-2-ylpenicillin disodium salt dihydrate, M.P. 253–254° C. (dec.) $[\alpha]_D^{20}$ +175° C. (in water).

*Example 4*

Triethylamine (0.7 ml., 0.005 mole) was added to a stirred solution of pyridine-2,3-dicarboxylic acid (0.835 g., 0.005 mole) in dry tetrahydrofuran (50 ml.). The solution was cooled to 0° C., ethyl chloroformate (0.5 ml., 0.005 mole) was added dropwise, and stirring at 0° C. was continued for one hour. After cooling to −30° C. the mixture was filtered to remove triethylamine hydrochloride and the filtrate was added to an aqueous solution of potassium 6-aminopenicillanate [prepared from 6-aminopenicillanic acid (1.08 g., 0.005 mole) and potassium hydroxide solution (4.5 ml. of 1.11 N solution, 0.005 equivalent)]. The mixture was then stirred for 1.5 hours during which time it attained room temperature. The solvent was evaporated at ca. 30° C./3 mm., the last traces of water being removed by azeotropic distillation with n-butanol (2.0 ml.) under the same conditions. Yellow solid residue was dried in vacuo. There was thus obtained an isomeric mixture of potassium 3-carboxypyrid-2-ylpenicillanate and potassium 2-carboxypyrid-3-ylpenicillanate, M.P. 190–195° C. (dec.). Colorimetric assay with hydroxylamine against a benzylpenicillin standard indicated a purity of 100%.

The same method was used to effect the following conversions: pyrazine-2,3-dicarboxylic acid to dipotassium 3 - carboxypyrazin - 2 - ylpenicillanate, M.P. 195–200° C. (dec.) purity (hydroxylamine assay) ca. 80%; 5,6-dimethyl-pyrazine-2,3-dicarboxylic acid to potassium 3-carboxy-5,6-dimethylpyrazin - 2 - ylpenicillanate, M.P. 205–210° C. (dec.), purity (hydroxylamine assay) ca. 80%; pyridine-3,4-dicarboxylic acid to an isomeric mixture of potassium 3-carboxypyrid-4-ylpenicillanate and potassium 4-carboxypyrid-3-ylpenicillanate, M.P. 170–180° C. (dec.), purity (hydroxylamine assay) ca. 80%.

*Example 5*

A solution of sodium 6-aminopenicillanate was prepared from sodium bicarbonate (2.5 g.), water (25 ml.), and acetone (5 ml.) and cooled to 0° C. A solution of 3-benzyloxycarbonylquinoxaline-2-carbonyl chloride [prepared by refluxing 3-benzyloxycarbonylquinoxaline-2-carboxylic acid (2 g.) with thionyl chloride (1.5 ml.) for 30 minutes and evaporating the excess thionyl chloride in vacuo] in dry acetone (10 ml.) was added to the stirred solution of sodium 6-aminopenicillanate dropwise during 10 minutes, keeping the temperature at 0° C. for a further 5 minutes. Methyl isobutyl ketone (5 ml.) was added, and the mixture was stirred for a further period of 15 minutes, during which time it attained room temperature. The organic layer was discarded, the aqueous phase was covered with ether (50 ml.) and acidified with 2 N hydrochloric acid. The ethereal extract was washed with water (10 ml.), dried (magnesium sulphate) and evaporated under reduced pressure at room temperature to ca. 10 ml. Cooling to 0° C. produced a white precipitate of 3-benzyloxycarbonylquinoxalin - 2 - ylpenicillin, M.P. 167–170° C. (dec.). (Found: C, 59.6; H, 4.4; N, 11.3%. $C_{25}H_{22}N_4O_6S$ requires C, 59.3; H, 4.35; N, 11.05%.)

*Example 6*

Ethyl chloroformate (0.5 ml.) was added dropwise to a stirred solution of 3-ethoxycarbonylquinoxaline-2-carboxylic acid (1.23 g.) and triethylamine (0.7 ml.) in dry tetrahydrofuran (50 ml.) at 0° C. After stirring at 0° C. for one hour, the mixture was cooled to −30° C. and filtered to remove triethylamine hydrochloride. The filtrate was added to a stirred aqueous solution of potassium 6-aminopenicillanate [prepared from 6-aminopenicillanic acid (1.08 g.) and potassium hydroxide solution (4.5 ml. of 1.11 N solution)]. Stirring was continued for 1.5 hours, during which time the solution attained room temperature. The solvent was evaporated at ca. 30° C./3 mm., the last traces of water being removed by azeotropic distillation with n-butanol (2.0 ml.) under the same conditions. The white solid residue was dried in vacuo to give crude potassium 3-ethoxycarbonylquinoxalin-2-ylpenicillin, M.P. 210–215° C. (dec.), purity (hydroxylamine assay) ca. 86%.

This procedure was used to convert a number of hemiesters and hemi-amides of quinoxaline -2,3-dicarboxylic acid to the potassium salts of the following esters and amides of 3-carboxyquinoxalin-2-ylpenicillin:

| | M.P., ° C. (dec.) | Percent purity (hydroxylamine assay) |
|---|---|---|
| Esters: | | |
| n-Propyl | 200–210 | 73 |
| iso-Propyl | 205–210 | 100 |
| Butyl | 150–160 | 71 |
| n-Decyl | 230–235 | 73 |
| β-Diethylaminoethyl | 200–210 | 94 |
| Cyclohexyl | 155–156 | |
| Phenyl | 205–210 | 78 |
| Benzyl | 130–135 | 100 |
| Amides: | | |
| Amino | 180–190 | 56 |
| Diethylamino | 210–215 | 75 |
| n-Propylamino | 140–150 | 41 |
| Piperidino | 200–210 | 97 |
| Anilino | 205–210 | 50 |
| N-methylanilino | 193–199 | 95 |

Example 7

3-methoxycarbonylquinoxaline-2-carboxylic acid (1.16 g.) was converted to its triethylamine salt and then reacted with potassium 6-aminopenicillanate by the procedure described in Example 6. Instead of evaporating the solvent, a further amount of water (20 ml.) and ether (50 ml.) were added and the mixture well shaken. The aqueous phase was separated, covered with ether (30 ml.), cooled with ice and acidified with 2 N hydrochloric acid with vigorous shaking.

The ethereal extract was washed with water (3 x 30 ml.) and then extracted with sodium bicarbonate solution (0.5 g. in 20 ml. water). The ethereal layer was discarded and methyl isobutyl ketone (20 ml.) was added to the aqueous phase, which was then chilled with ice and acidified with 2 N hydrochloric acid with vigorous shaking. The organic layer was separated, washed with water (4 x 20 ml.), dried (magnesium sulphate) and treated with a solution of potassium 2-ethylhexanoate in methyl isobutyl ketone (6.7% w./v.) until there was no further turbidity. The white precipitate was collected, washed with dry ether and dried in vacuo, over phosphorus pentoxide. There was thus obtained potassium 3-methoxycarbonylquinoxalin-2-penicillin, M.P. 210–220° C. (dec.), purity (hydroxylamine assay) ca. 95%.

The infra-red absorption spectra of all the penicillins prepared in the above seven examples were characteristic of a β-lactam ring system.

Example 8

Ethyl chloroformate (0.25 ml.) was added to a stirred solution of 3-benzyloxycarbonylquinoxaline-2-ylpenicillin and triethylamine (0.35 ml.) in dry tetrahydrofuran (50 ml.) at 0° C. After stirring for 1 hour at 0° C., the mixture was cooled to −30° C. and filtered to remove triethylamine hydrochloride. The stirred filtrate was treated with ammonia solution (e.g. 0.88, 0.15 ml.), and stirring continued for 2 hours, during which time the mixture attained room temperature. Solvent was evaporated at ca. 30° C./3 mm., the final traces of water being removed by azeotropic distillation with n-butanol (2.0 ml.). The yellow residue was dried in vacuo over phosphorus pentoxide to give 3-benzyloxycarbonylquinoxaline-2-ylpenicillinamide, M.P. 110–120° C. The infra-red spectrum was consistent with a penicillinamide structure.

Example 9

Material for injection was prepared by sterilising finely-powdered disodium - 3 - carboxyquinoxalin - 2 - yl - penicillanate with ethylene oxide and packing 0.5 g. quantities aseptically into sterilised vials. Solutions for injections were subsequently prepared by adding sterile water for injection (2.5 ml.) to each vial immediately before use.

Example 10

A sustained release injection in the form of an oil-in-water emulsion was prepared by incorporating sterile, finely-powdered disodium 3-carboxyquinoxalin-2-ylpenicillanate (20 w./w.) in the following base.

| | Percent w./w. |
|---|---|
| Micro-crystalline paraffin wax | 5.0 |
| White beeswax | 5.0 |
| Light liquid paraffin | 35.0 |
| Sorbitan sesquioleate | 5.0 |
| Chloroscresol | 0.1 |
| Water to 100 | |

Sorbitan sesquioleate is a surface-active agent commercially available under the trade name Arlacel 83.

Example 11

Intra-mammary injections suitable for treating bovine mastitis were prepared from the following ingredients.

Formulation A

| | Percent w./w. |
|---|---|
| Disodium 3-carboxyquinoxalin-2-ylpenicillate | 20 |
| Beeswax | 10 |
| Polyoxyethylene stearate | 5 |
| Isopropylmyristate to 100 | |

Formulation B

| | |
|---|---|
| Cetostearyl alcohol B.P. | 5 |
| Glycerol monostearate | 5 |
| Polyoxyethylene stearate | 5 |
| Isopropyl myristate to 100 | |

Polyoxyethylene stearate is a surface active agent available under the trade name Myrj 52.

The finely-powdered penicillin disodium salt was sterilised with ethylene oxide and added to a heat-sterilised mixture of the other ingredients.

Example 12

A batch of tablets was prepared in the following manner: A mixture of disodium 3-carboxyquinoxalin-2-yl-penicillanate (250 g.), maize starch (45 g.) and finely-powdered stearic acid (5 g.) was granulated by dry compression. The sieved granules were compressed into tablets weighing ca. 300 mg.

We claim:

1. A penicillin compound selected from the group of acids of the formula

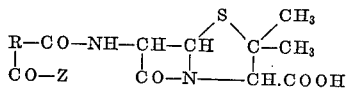

and the non-toxic salts thereof in which Z is selected from the group consisting of hydroxy, lower alkoxy, benzyl oxy, phenoxy, amino, lower alkyl amino, di-lower alkyl amino, benzyl amino, anilino and N-methyl anilino and R is a divalent heterocyclic radical of a formula selected from the group consisting of

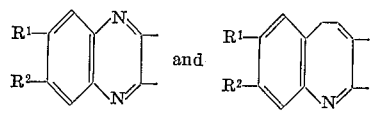

in which $R^1$ and $R^2$ are selected from the group consisting of hydrogen and lower alkyl.

2. A penicillin according to claim 1 in which $R^1$ and $R^2$ are hydrogen.

3. A penicillin compound selected from the group consisting of acids of the formula

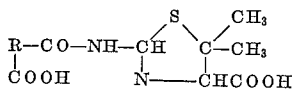

and the non-toxic amine, alkali metal and ammonium salts thereof wherein R is a divalent heterocyclic radical of a formula selected from the group consisting of

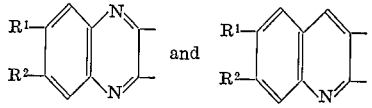

in which $R^1$ and $R^2$ are selected from the group consisting of hydrogen and lower alkyl.

4. A penicillin compound selected from the group consisting of 3-carboxyquinoxalin-2-ylpenicillin and the non-toxic salts thereof.

5. A penicillin composition selected from the group consisting of an isomeric mixture of 3-carboxyquinol-2-ylpenicillin and 2-carboxyquinol-3-ylpenicillin and the non-toxic salts of such isomeric mixture.

(References on following page)

References Cited by the Examiner

UNITED STATES PATENTS

| | | | |
|---|---|---|---|
| 2,593,852 | 4/1952 | Cooper | 260—239.1 |
| 2,908,609 | 10/1959 | Aterno | 167—53.2 |
| 2,941,995 | 6/1960 | Doyle | 260—239.1 |
| 3,004,888 | 10/1961 | Conover | 167—53.2 |
| 3,035,047 | 3/1962 | Perron | 260—239.1 |
| 3,049,473 | 8/1962 | Beatson | 167—53.2 |
| 3,174,964 | 3/1965 | Hobbs et al. | 260—239.1 |

FOREIGN PATENTS 967,890  8/1964  Great Britain.

OTHER REFERENCES

Goldberg, Antibiotics, Their Chemistry and Non-Medical Uses, pages 178 and 466, published by D. Van Nostrand Company, Inc., Princeton, New Jersey, 1959.

Nickell, Chem. Abst., volume 48, 1954, pages 5425 and 5426.

ALEX MAZEL, *Primary Examiner.*

FRANK CACCIAPAGLIA, JR., HENRY R. JILES,
*Examiners.*

SAM ROSEN, JAMES W. ADAMS, JR.,
*Assistant Examiners.*

UNITED STATES PATENT OFFICE
CERTIFICATE OF CORRECTION

Patent No. 3,274,175                  September 20, 1966

Hugh Colin Richards et al.

It is hereby certified that error appears in the above numbered patent requiring correction and that the said Letters Patent should read as corrected below.

Column 10, lines 42 to 45, the right-hand portion of the formula should appear as shown below instead of as in the patent:

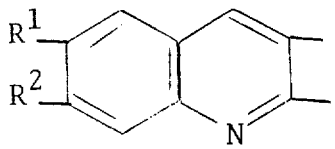

Signed and sealed this 22nd day of August 1967.

(SEAL)
Attest:

ERNEST W. SWIDER
Attesting Officer

EDWARD J. BRENNER
Commissioner of Patents